United States Patent
Park et al.

(10) Patent No.: US 9,734,423 B2
(45) Date of Patent: Aug. 15, 2017

(54) SYSTEM AND METHOD FOR IMAGE-BASED STRUCTURAL HEALTH MONITORING SUITABLE FOR STRUCTURES HAVING UNCERTAIN LOAD CONDITIONS AND SUPPORT CONDITIONS

(71) Applicant: Industry-Academic Cooperation Foundation, Yonsei University, Seoul (KR)

(72) Inventors: Hyo Seon Park, Seoul (KR); Jun Su Park, Seoul (KR); Byung Kwan Oh, Seoul (KR); You Sok Kim, Yongin (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 162 days.

(21) Appl. No.: 14/827,615

(22) Filed: Aug. 17, 2015

(65) Prior Publication Data
US 2016/0225155 A1  Aug. 4, 2016

(30) Foreign Application Priority Data
Jan. 29, 2015  (KR) .................. 10-2015-0014300

(51) Int. Cl.
*G06K 9/00*  (2006.01)
*G06K 9/46*  (2006.01)
*G06K 9/20*  (2006.01)
*G01M 5/00*  (2006.01)

(52) U.S. Cl.
CPC ........... *G06K 9/468* (2013.01); *G01M 5/0058* (2013.01); *G06K 9/2054* (2013.01)

(58) Field of Classification Search
None
See application file for complete search history.

(56) References Cited

U.S. PATENT DOCUMENTS

| | | | | |
|---|---|---|---|---|
| 4,958,306 | A * | 9/1990 | Powell | ............... G01C 7/04 702/40 |
| 5,753,808 | A * | 5/1998 | Johnson | ............... E01C 23/01 73/146 |
| 2006/0274930 | A1 * | 12/2006 | Laurent | ............... G01C 7/04 382/141 |

OTHER PUBLICATIONS

A proposal of the gage-free safety assessment—system, Se Woon Choi et al., Nov. 27, 2014, Springer, pp. 219-227.*

(Continued)

*Primary Examiner* — Jayesh A Patel
(74) *Attorney, Agent, or Firm* — Lex IP Meister, PLLC (57) ABSTRACT

An image-based structural health monitoring system and method are disclosed herein. The image-based structural health monitoring system includes a marker image acquisition unit, a marker coordinate calculation unit, a shape function determination unit, and a structural health evaluation unit. The marker image acquisition unit acquires marker images of markers attached onto the surface of a structure. The marker coordinate calculation unit calculates the coordinates of the markers in the marker images. The shape function determination unit determines a shape function by performing spline interpolation based on the calculated marker coordinates. The structural health evaluation unit evaluates the structural health of the structure by calculating the strain or stress of the structure based on the radius of curvature calculated at each location on the determined shape function.

19 Claims, 4 Drawing Sheets

(56) References Cited

OTHER PUBLICATIONS

Park, Jun-Su et al., "Effects of the number and location of measurement points on the estimation of stress distribution for the steel beam structure using Motion capture system and Cubic smoothing spline interpolation", Korea Institute for Structural Maintenance and Inspection, Fall Season, Oct. 2014, pp. 40-43.
Park, Jun-Su et al., "A Proposal of the Gage-Free Safety Assessment Technique for the Steel Beam Structure Under Uncertain Loads and Support Conditions Using Motion Capture System", Ad Hoc Networks; Lecture Notes of the Institute for Computer Sciences, Social Informatics and Telecommunications Engineering, vol. 140, Nov. 2014, pp. 219-227.
Jun Su Park et al., "A Proposal of the Gage-Free Safety Assessment Technique for the Steel Beam Structure Under Uncertain Loads and Support Conditions Using Motion Capture System", ADHOCNETS—6th International conference on Ad Hoc Netwirks, Aug. 18, 2014.

* cited by examiner

SYSTEM AND METHOD FOR IMAGE-BASED STRUCTURAL HEALTH MONITORING SUITABLE FOR STRUCTURES HAVING UNCERTAIN LOAD CONDITIONS AND SUPPORT CONDITIONS

BACKGROUND

1. Technical Field

The present invention relates generally to structural monitoring technology, and more particularly to structural monitoring technology using motion capture.

2. Description of the Related Art

Construction structures are exposed to various loads, such as permanent load, wind load, seismic load, etc., in construction and usage stages. Accordingly, the evaluation of usability and structural health of structure is important procedure that must be performed in the structure design stage. If performance degrades in a structure due to large load, which has not been expected in a structure design stage, or deterioration, usability and structural health of the structure may be accompanied with much troubles.

To deal with this problem, Structural Health Monitoring (SHM) systems for evaluating usability and structural health of a structure in construction stage and usage stage have been proposed.

Structural monitoring may be classified into structural health monitoring and usability monitoring according to its purpose. Structural health monitoring is activity for monitoring the strain of a structure regarding, for example, the inclination of a building or the bending of columns, whereas usability monitoring is activity for monitoring the displacement of a structure regarding the residential sentiment of dwellers, such uneasiness about the vibration of a building due to wind.

Usually, strain gauges are used in structural health monitoring, whereas accelerometers or displacement meters are used in usability monitoring.

To evaluate the structural health of a structure, it is very important to estimate strain and stress observed at respective locations of the structure. In particular, the maximum stress should not exceed allowable stress suggested in the design standard.

Since it is difficult to measure stress at all the locations of a structure, strain and stress can be calculated by locating places with large stress via structural analysis, attaching strain sensors onto the places and then performing structural analysis based on measured values from the strain sensors.

However, in actual structures, due to inaccurate locations and magnitudes of load applied to the structures and uncertainty of support conditions of the structures, drawbacks, such as lack of confidence in the results of structural analysis and complication of wiring and limitation of measuring locations because sensors are connected with by cables.

The problem of sensors being connected with by cables can be overcome using image-based monitoring systems, such as laser systems, light detection and ranging (LIDAR) systems, or motion capture systems (MCS).

However, the problems of necessity of accurate load conditions and support conditions are common limitations of conventional structural monitoring researches.

As a result, there is still a need for structural monitoring methodology that can be applied to cases where load and support conditions are uncertain because it uses an image-based monitoring system but is not limited by load and support conditions.

SUMMARY

At least one embodiment of the present invention is directed to the provision of an image-based structural health monitoring system and method that are suitable for structures having uncertain load and support conditions.

At least one embodiment of the present invention is directed to the provision of a motion capture technology-based structural health monitoring system and method that can be applied to cases where load and support conditions are uncertain.

In accordance with an aspect of the present invention, there is provided an image-based structural health monitoring system, including: a marker image acquisition unit configured to acquire marker images of markers attached onto the surface of a structure; a marker coordinate calculation unit configured to calculate the coordinates of the markers in the marker images; a shape function determination unit configured to determine a shape function by performing spline interpolation based on the calculated marker coordinates; and a structural health evaluation unit configured to evaluate the structural health of the structure by calculating the strain or stress of the structure based on the radius of curvature calculated at each location on the determined shape function.

The shape function determination unit may be operative to determine the shape function by performing cubic smoothing spline interpolation on the calculated marker coordinates.

The shape function determination unit may be operative to, in order to determine a spline polynomial for each subsection between two neighboring sets of marker coordinates, obtain the coefficients of the spline polynomial so that two spline polynomials for two neighboring subsections satisfy all conditions in which a first derivative is continuous, a second derivative is continuous, and the values of second derivatives are 0 at two ends.

The shape function determination unit may be operative to obtain the coefficients of the spline polynomial that additionally satisfy a condition in which the square error between the marker coordinate values and the spline polynomial is minimized and a condition in which the curvature of the spline polynomial is minimized, for each subsection.

The shape function determination unit may be operative to obtain the coefficients of the spline polynomial that additionally satisfy a condition in which the weighted sum, of the square error between the marker coordinate values and the spline polynomial, and the curvature of the spline polynomial, is minimized, for each subsection.

The shape function determination unit may be operative to apply the condition in which the weighted sum of the square error between the marker coordinate values and the spline polynomial and the curvature of the spline polynomial is minimized in accordance with an equation below:

$$\text{minimize } p \sum_{i=1}^{n} (z_i - S(x_i))^2 + (1-p) \int (S''(x))^2 dx$$

where p is a smoothing parameter having a value ranging from 0 to 1 and corresponds to $p \simeq 1/(1+H^3/6)$, H is an average interval value between the passive markers, $z_i$ is a z axis coordinate value of an i-th set of marker coordinates of n sets of marker coordinates, $x_i$ is an x axis coordinate value of the i-th set of marker coordinates, S(x) is the spline polynomial, S''(x) is the second derivative of the spline polynomial, an x axis is parallel to a neutral axis of an undeformed structure, and a z axis is parallel to a direction in which the structure is deformed and is perpendicular to the x axis.

The structural health evaluation unit may be operative to calculate the radius of curvature at each location on the shape function in accordance with an equation below:

$$r(\bar{x}_j) = \frac{(f'(\bar{x}_j)^2 + 1)^{3/2}}{f''(\bar{x}_j)} \text{ for } j = 1 \text{ to } N$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is the radius of curvature at $\bar{x}_j$, $f'(\bar{x}_j)$ is a first derivative of shape function $f(\bar{x})$ at $\bar{x}_j$, and $f''(\bar{x}_j)$ is a second derivative of shape function $f(\bar{x})$ at $\bar{x}_j$.

The structural health evaluation unit may be operative to calculate the strain in accordance with an equation below:

$$\varepsilon(\bar{x}_j) = -\frac{y}{\rho(\bar{x}_j)}$$

where y is a distance from a neutral axis of the structure to the surface thereof, and $\epsilon(\bar{x}_j)$ is the strain calculated at $\bar{x}_j$.

The structural health evaluation unit may be operative to calculate the stress in accordance with an equation below:

$$\sigma(\bar{x}_j) = E\varepsilon(\bar{x}_j) = -E\frac{y}{\rho(\bar{x}_j)}$$

where E is an elastic modulus of the structure, and $\sigma(\bar{x}_j)$ is the stress calculated at $\bar{x}_j$.

In accordance with an aspect of the present invention, there is provided an image-based structural health monitoring method, the method being performed by a computer, the method comprising: by a computer, acquiring marker images of markers attached onto the surface of a structure; calculating the coordinates of the markers in the marker images; determining a shape function by performing spline interpolation based on the calculated marker coordinates; and evaluating the structural health of the structure by calculating strain or stress of the structure based on a radius of curvature calculated at each location on the determined shape function.

Determining the shape function may include determining the shape function by performing cubic smoothing spline interpolation on the calculated marker coordinates.

Determining the shape function may include, in order to determine a spline polynomial for each subsection between two neighboring sets of marker coordinates, obtaining the coefficients of the spline polynomial so that two spline polynomials for two neighboring subsections satisfy all conditions in which a first derivative is continuous, a second derivative is continuous, and the values of second derivatives are 0 at two ends.

Determining the shape function may include obtaining the coefficients of the spline polynomial that additionally satisfy a condition in which the square error between the marker coordinate values and the spline polynomial is minimized and a condition in which the curvature of the spline polynomial is minimized, for each subsection.

Determining the shape function may include obtaining the coefficients of the spline polynomial that additionally satisfy a condition in which the weighted sum, of the square error between the marker coordinate values and the spline polynomial, and the curvature of the spline polynomial, is minimized, for each subsection.

Determining the shape function may include applying the condition in which the weighted sum of the square error between the marker coordinate values and the spline polynomial and the curvature of the spline polynomial is minimized in accordance with an equation below:

$$\text{minimize } p\sum_{i=1}^{n}(z_i - S(x_i))^2 + (1-p)\int (S''(x))^2 dx$$

where p is a smoothing parameter having a value ranging from 0 to 1 and corresponds to $p \simeq 1/(1+H^3/6)$, H is an average interval value between the passive markers, $z_i$ is a z axis coordinate value of an i-th set of marker coordinates of n sets of marker coordinates, $x_i$ is an x axis coordinate value of the i-th set of marker coordinates, S(x) is the spline polynomial, S''(x) is the second derivative of the spline polynomial, an x axis is parallel to a neutral axis of an undeformed structure, and a z axis is parallel to a direction in which the structure is deformed and is perpendicular to the x axis.

Evaluating the structural health may include calculating the radius of curvature at each location on the shape function in accordance with an equation below:

$$r(\bar{x}_j) = \frac{(f'(\bar{x}_j)^2 + 1)^{3/2}}{f''(\bar{x}_j)} \text{ for } j = 1 \text{ to } N$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is the radius of curvature at $\bar{x}_j$, $f'(\bar{x}_j)$ is a first derivative of shape function $f(\bar{x})$ at $\bar{x}_j$, and $f''(\bar{x}_j)$ is a second derivative of shape function $f(\bar{x})$ at $\bar{x}_j$.

Evaluating the structural health may include calculating the strain in accordance with an equation below:

$$\varepsilon(\bar{x}_j) = -\frac{y}{\rho(\bar{x}_j)}$$

where y is a distance from a neutral axis of the structure to the surface thereof, and $\epsilon(\bar{x}_j)$ is the strain calculated at $\bar{x}_j$.

Evaluating the structural health may include calculating the stress in accordance with an equation below:

$$\sigma(\bar{x}_j) = E\varepsilon(\bar{x}_j) = -E\frac{y}{\rho(\bar{x}_j)}$$

where E is an elastic modulus of the structure, and $\sigma(\bar{x}_j)$ is the stress calculated at $\bar{x}_j$.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

With regard to embodiments of the present invention disclosed herein, specific structural and functional descriptions are given merely for the purpose of illustrating the embodiments of the present invention. Embodiments of the present invention may be practiced in various forms, and the present invention should not be construed as being limited to embodiments disclosed herein.

Embodiments of the present invention will be described in detail below with reference to the accompanying drawings. The same reference numerals will be used to denote the same components throughout the accompanying drawings, and redundant descriptions of the same components will be omitted.

Figure 1:
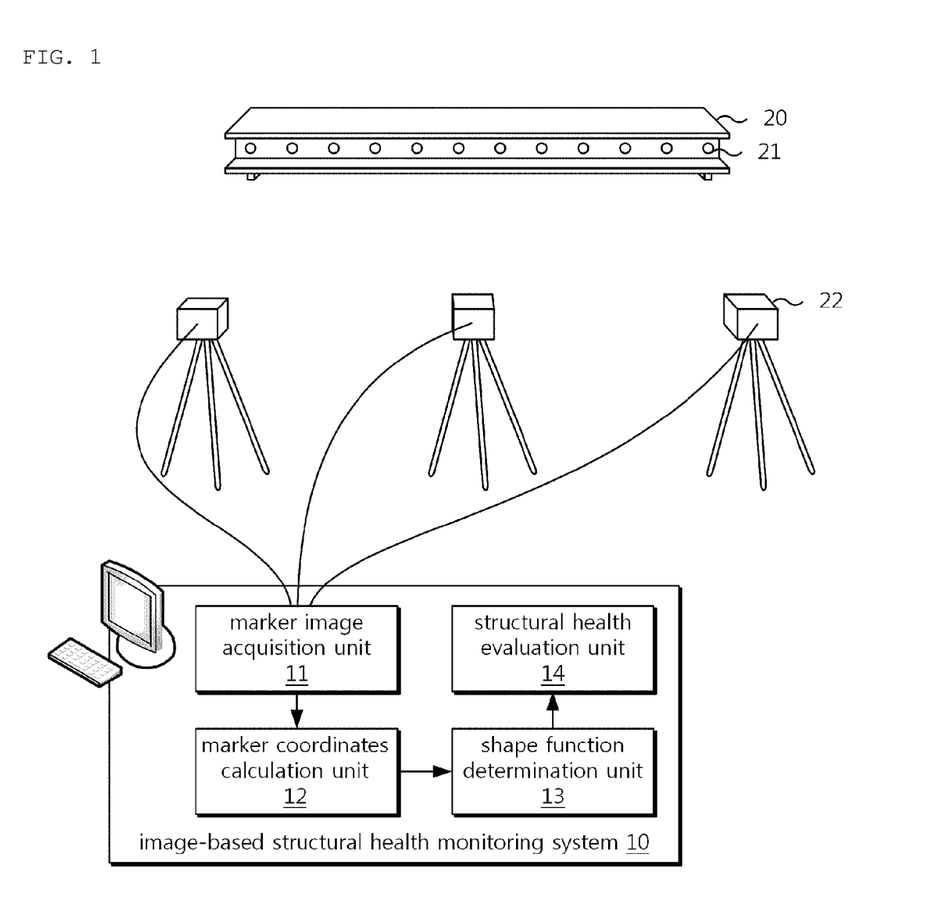
FIG. 1 is a conceptual diagram illustrating an image-based structural health monitoring system according to an embodiment of the present invention.

FIG. 1 is a conceptual diagram illustrating an image-based structural health monitoring system 10 according to an embodiment of the present invention.

Referring to FIG. 1, the image-based structural health monitoring system 10 according to the present embodiment may include a marker image acquisition unit 11, a marker coordinate calculation unit 12, a shape function determination unit 13, and a structural health evaluation unit 14.

The image-based structural health monitoring system 10 acquires marker images from at least two cameras 22. The at least two cameras 22 provides marker images of passive markers 21 attached onto the surface of a structure 20 whose structural health needs to be evaluated. The passive markers 21 are fabricated to desirably reflect light having a predetermined color or wavelength, for example, infrared light, are attached onto the surface of the structure 20 at predetermined intervals, and can reflect light that is emitted by a strobe.

In FIG. 1, the structure 20 is an H-shaped steel beam by way of example. Supports are present at both ends of the structure 20, and a load is applied to the middle point of the structure 20. The passive markers 21 are attached onto surfaces of the structure 20, at the supports and in-between the supports at predetermined intervals along the neutral axis of the structure 20.

The cameras 22 are appropriately calibrated using well-known calibration techniques in order to perform motion capture.

The marker image acquisition unit 11 of the image-based structural health monitoring system 10 may acquire marker images, of the passive markers 21 attached onto the surface of the structure 20, from the cameras 22.

The marker coordinate calculation unit 12 may calculate the coordinates of the passive markers 21 in the marker images based on a predetermined coordinate system, for example, a real world coordinate system in which the structure 20 is disposed.

The shape function determination unit 13 may determine a shape function by performing spline interpolation based on the calculated coordinates of the markers.

In an embodiment, the shape function determination unit 13 may determine a shape function by performing cubic smoothing spline interpolation on the calculated coordinates of the markers.

Figure 2:
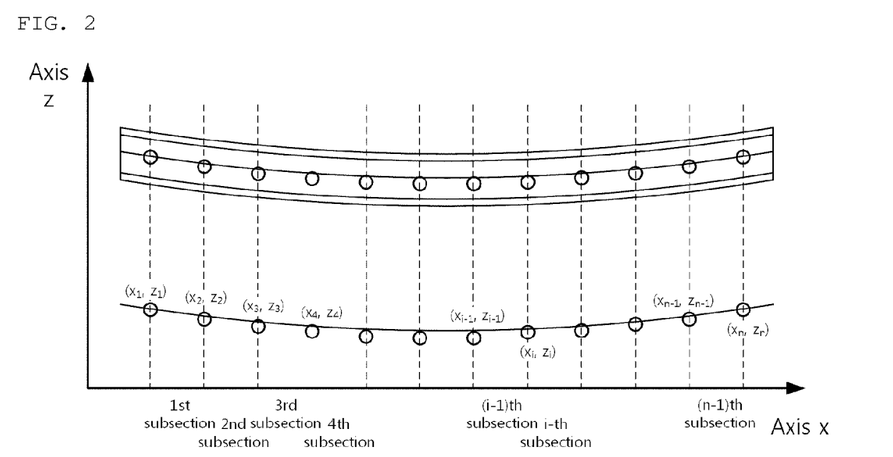
FIG. 2 is a graph illustrating shape functions that are determined by the determination unit of an image-based structural health monitoring system according to an embodiment of the present invention.

Referring to FIG. 2 in order to describe a shape function based on cubic smoothing spline interpolation, FIG. 2 is a graph illustrating shape functions that are determined along the shape of a deformed structure by a shape function determination unit in an image-based structural health monitoring system according to an embodiment of the present invention.

In FIG. 2, the structure 20 has been deformed because a load is applied in the middle of two supports. Accordingly, locations of the passive markers 21 have been moved from the locations without load, by respective displacements along the z axis due the to load.

Once the marker coordinate calculation unit 12 has calculated the marker coordinates of the passive markers 21, the shape function determination unit 13 may determine a spline polynomial for each subsection between two neighboring sets of marker coordinates.

In this case, spline polynomials must satisfy all the following conditions: a first condition in which a first derivative must be continuous, a second condition in which a second derivative must be continuous, and a third condition in which the values of second derivatives are respectively equal to 0 at the two supports of both ends. Accordingly, the spline polynomial is, for example, a cubic polynomial.

The first to third conditions are illustrated by Equations 1, 2 and 3, respectively. In the following, for ease of description, it is assumed that an i-th marker coordinates is represented as 2D coordinates ($x_i$, $z_i$), deformation attributable to the load occurs only along the z axis, and the neutral axis of a steel beam, i.e., an example of the structure 20, in an ideal case where there is no load, is parallel to the x axis. In other words, the x axis is parallel to a rectilinear line that passes through locations at which the passive markers have been attached onto an idealized undeformed structure, and the z axis is parallel to a direction in which the structure is deformed by the load and is perpendicular to the x axis.

$$f'_{i-1}(x_i) = f'_i(x_i) \text{ for } i = 2, 3, 4, \ldots, n-1 \quad (1)$$

$$f''_{i-1}(x_i) = f''_i(x_i) \text{ for } i = 2, 3, 4, \ldots, n-1 \quad (2)$$

$$f_1''(x_1) = \frac{d^2 f_1}{dx^2} = 6a_1 x_1 + 2b_1 = 0 \tag{3}$$

$$f_{n-1}''(x_n) = \frac{d^2 f_{n-1}}{dx^2} = 6a_{n-1} x_n + 2b_{n-1} = 0$$

In Equations 1, 2 and 3, i is a sequential index of n sets of marker coordinates, $x_i$ is the x axis coordinate value of an i-th marker coordinates, $f_i(x)$ is an i-th spline polynomial corresponding to a subsection from the i-th marker coordinates to an (i+1)-th marker coordinates, $f_i'(x)$ is the first derivative of the i-th spline polynomial at the location of coordinate x, $f_i''(x)$ is the second derivative of the i-th spline polynomial at the location of coordinate x, a is the coefficient of a quadratic term and b is the coefficient of a cubic term, when the spline polynomial is a cubic polynomial.

Meanwhile, the marker coordinates may have some errors due to various factors, such as vibration of a camera, refraction and scattered reflection of light, chromatic aberration, thermal noise of an image sensor, artifacts in image, etc.

Accordingly, there is no guarantee that a shape function accurately passing all of the marker coordinates is a true shape function that accurately complies with the deformation of the structure 20. Furthermore, a shape function, obtained by performing 3D spline interpolation so that all the marker coordinates must be passed through, may have distortion, such as abrupt overshoot, which is unrealistic.

Accordingly, the shape function determination unit 13 is not necessarily bound to determine a shape function such that the all of the marker coordinates are accurately passed through.

In an embodiment, the shape function determination unit 13 may obtain the coefficients of the spline polynomial, such that a fourth condition, in which the square error between the marker coordinate values and the spline polynomial is minimized, and a fifth condition, in which the curvature of the spline polynomial is minimized, are additionally satisfied for each subsection.

The fourth and fifth conditions are illustrated by Equations 4 and 5 below, respectively:

$$\text{minimize} \sum_{i=1}^{n} (z_i - S(x_i))^2 \tag{4}$$

$$\text{minimize} \int (S''(x))^2 dx \tag{5}$$

In this case, $z_i$ is the z axis coordinate value of the i-th marker coordinates among n marker coordinates, $x_i$ is the x axis coordinate value of the i-th marker coordinates, S(x) is a spline polynomial, and S''(x) is the second derivative of the spline polynomial.

The fourth condition of Equation 4 is a condition in which makes a spline curve close to measured marker coordinates, whereas the fifth condition of Equation 5 is a condition in which makes the curvature of a spline curve decreased, i.e., that makes a spline curve less curved. Accordingly, the fourth and fifth conditions are conditions that conflict with each other.

In an embodiment, in order to systematically satisfy the fourth and fifth conditions, the shape function determination unit 13 may obtain the coefficients of the spline polynomial such that a sixth condition in which the weighted sum, of the square error between marker coordinate values and the spline polynomial, and the curvature of the spline polynomial, is minimized, is additionally satisfied for each subsection.

The sixth condition is illustrated by Equation 6 below:

$$\text{minimize } p \sum_{i=1}^{n} (z_i - S(x_i))^2 + (1-p) \int (S''(x))^2 dx \tag{6}$$

Where p is a smoothing parameter having a value ranging from 0 to 1, $z_i$ is the z axis coordinate value of the i-th marker coordinates among n marker coordinates, $x_i$ is the x axis coordinate value of the i-th marker coordinates, S(x) is the spline polynomial, and S''(x) is the second derivative of the spline polynomial.

When the smoothing parameter p is 1, Equation 6 becomes equal to Equation 4, and Equation 5 is substantially not taken into account. The shape function, having to pass through the marker coordinates, possibly suffers distortion such as overshoot or oscillation, as a natural cubic spline curve usually does.

In contrast, when the smoothing parameter p is 0, Equation 6 becomes equal to Equation 5, and Equation 4 is not taken into account. The shape function becomes a rectilinear line minimizing the square error between the marker coordinates, and in some cases may barely meet the marker coordinates.

Accordingly, it is necessary to determine the smoothing parameter p to be an appropriate value between 0 and 1, i.e., two extremes. For this purpose, the shape function determination unit 13 may apply the sixth condition in which the weighted sum, of the square error between the marker coordinate values and the spline polynomial, and the curvature of the spline polynomial, is minimized, based on the smoothing parameter p that is determined, as in Equation 7 below:

$$p \approx 1/(1+H^3/6) \tag{7}$$

In this case, H is the average interval value between the passive markers 21. p may be selected appropriately, for example, empirically, within a predetermined range around a value calculated by Equation 7. The denominator of a term including $H^3$ may be selected between 0.6 and 60, instead of 6 represented in Equation 7. When the denominator of this term gets larger, the smoothing parameter p becomes larger, and thus a shape function may be obtained so as to be closer to the marker coordinates and to have more grooves. In contrast, when the denominator of the term gets smaller, the smoothing parameter p also gets smaller, and thus a shape function that is moderately smoothed, passing through the marker coordinates, may be obtained.

Figure 3:
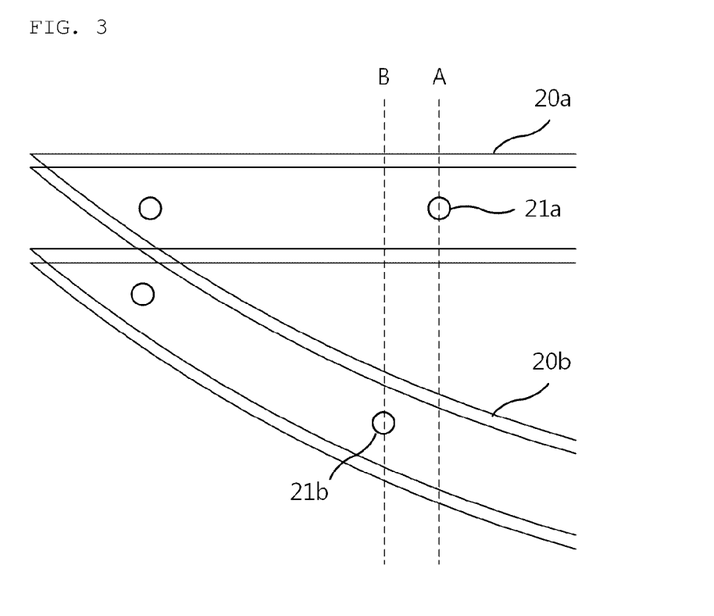
FIG. 3 is a schematic diagram illustrating a phenomenon, in which the intervals between measured data are made non-uniform due to the deformation of a structure, which is considered when the shape function determination unit of an image-based structural health monitoring system according to an embodiment of the present invention determines a shape function.

With regard to Equation 7, H is the average interval value between the passive markers 21, which means that the intervals between the passive markers 21 may be non-uniform. Referring to FIG. 3 in order to describe this point, FIG. 3 is a schematic diagram illustrating a phenomenon, in which the intervals between measured data are made non-uniform due to the deformation of a structure, which is considered when the shape function determination unit of an image-based structural health monitoring system according to an embodiment of the present invention determines a shape function.

In FIG. 3, deformation that occurs near a support at any one end of a structure is shown. Displacement along the z axis has been somewhat exaggerated for convenience of description.

A passive marker 21a attached onto the surface of a structure 20a having an ideally undeformed shape because there is no load is present at location A on the x axis.

A structure 20b has a deformed shape that is deformed by a load, and a passive marker 21b is present at location B on the x axis.

Accordingly, marker coordinates, calculated from marker images acquired from the structure 20b having a deformed shape, would have intervals that are not equal to each other although the difference of the intervals may be slight.

In view of the variations and errors in the intervals between the marker coordinates, the average interval value between the passive markers 21 may be taken into account in the determination of the spline polynomials, as in Equation 7.

In particular, in the case where the intervals between the passive markers 21 are non-uniform, one can obtain an appropriately curved shape function, neither excessively fluctuating nor excessively stiff, if the smoothing parameter p, about which the denominator, of a term including the cubic term $H^3$ of the average interval value H, is 6, as shown in Equation 7, is used.

Thereafter, the structural health evaluation unit 14 may evaluate the structural health of the structure 20 by calculating the strain or stress of the structure 20 based on the radius of curvature calculated at each location on the determined shape function.

In an embodiment, the structural health evaluation unit 14 may calculate the radius of curvature at each location on the determined shape function, as in Equation 8 below:

$$r(\bar{x}_j) = \frac{(f'(\bar{x}_j)^2 + 1)^{3/2}}{f''(\bar{x}_j)} \quad \text{for } j = 1 \text{ to } N \tag{8}$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is the radius of curvature at $\bar{x}_j$, $f'(\bar{x}_j)$ is the first derivative of shape function $f(\bar{x})$ at $\bar{x}_j$, and $f''(\bar{x}_j)$ is the second derivative of shape function $f(\bar{x})$ at $\bar{x}_j$.

In an embodiment, the shape function may be given as displacement values along the z axis, calculated at each of the interpolated intervals between coordinate values, for example, every interval of 0.0001 mm, on the $\bar{x}$ axis, instead of a pure polynomial. In this case, the derivative values of Equation 8 may be obtained via the four fundamental arithmetic operations of several previous and subsequent displacement values at each location on the $\bar{x}$ axis.

For example, $f'(\bar{x}_j)$ and $f''(\bar{x}_j)$ may be obtained by performing numerical differentiation, as shown in Equations 9 and 10, below:

$$f'(\bar{x}_j) = \frac{f(\bar{x}_j - 2h) - 8f(\bar{x}_j - h) + 8f(\bar{x}_j + h) - f(\bar{x}_j + 2h)}{12h} \tag{9}$$

$$f''(\bar{x}_j) = \frac{-f(\bar{x}_j - 2h) + 16f(\bar{x}_j - h) - 30f(\bar{x}_j) + 16f(\bar{x}_j + h) - f(\bar{x}_j + 2h)}{12h^2} \tag{10}$$

where h is intervals between coordinate values on the $\bar{x}$ axis of the interpolated shape function.

Once the radius of curvature has been calculated, the structural health evaluation unit 14 may calculate the strain according to Equation 11 below:

$$\varepsilon(\bar{x}_j) = -\frac{y}{\rho(\bar{x}_j)} \tag{11}$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is the radius of curvature at $\bar{x}_j$, y is the distance from the neutral axis of the structure 20 to the surface thereof, and $\varepsilon(\bar{x}_j)$ is strain calculated at $\bar{x}_j$.

Furthermore, the structural health evaluation unit 14 may calculate the stress using Equation 12 below:

$$\sigma(\bar{x}_j) = E\varepsilon(\bar{x}_j) = -E\frac{y}{\rho(\bar{x}_j)} \tag{12}$$

where E is the elastic modulus of the structure 20, and $\sigma(\bar{x}_j)$ is stress calculated at $\bar{x}_j$.

As can be seen from Equations 8, 11 and 12, although the support conditions or load conditions are not accurately known, the structural health evaluation unit 14 may calculate strain and stress at each support from the radius of curvature derived from an estimated shape function, and may estimate the strain or stress distribution of the overall structure 20.

By doing so, the image-based structural health monitoring system 10 according to the embodiment may estimate the strain or stress distribution of the structure 20 under uncertain support and load conditions, and may evaluate the structural health of the structure 20 based on the estimated strain or stress distribution.

Figure 4:
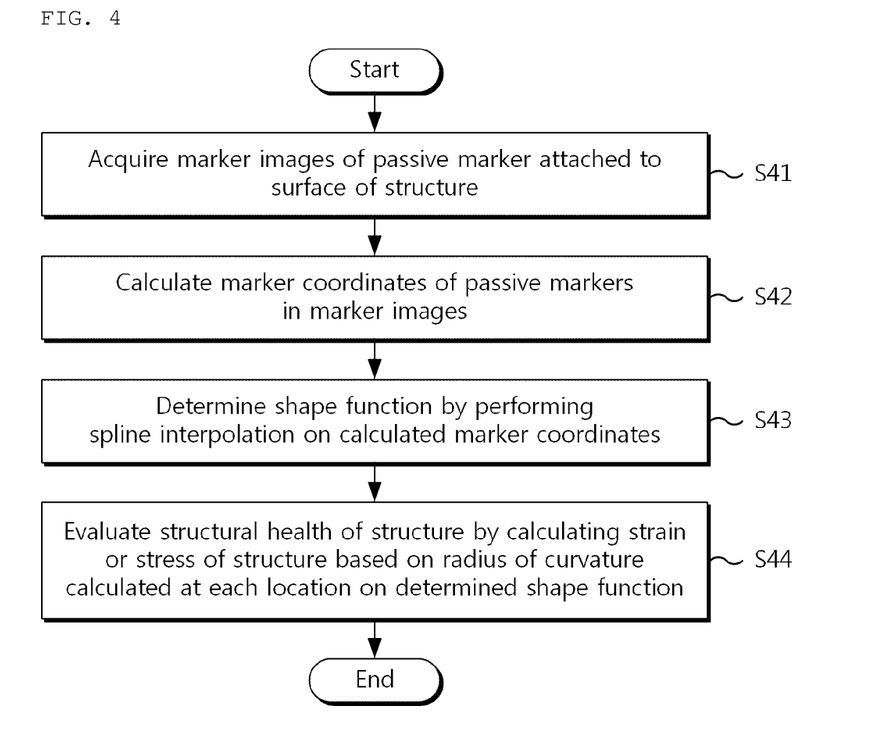
FIG. 4 is a flowchart illustrating an image-based structural health monitoring method according to an embodiment of the present invention.

FIG. 4 is a flowchart illustrating an image-based structural health monitoring method according to an embodiment of the present invention.

Referring to FIG. 4, the image-based structural health monitoring method that is performed by a computer according to the present embodiment may start with step S41 at which a computer acquires marker images of passive markers 21 attached onto the surface of a structure.

At step S42, the computer may calculate the marker coordinates of the passive markers in the marker images.

At step S43, the computer may determine a shape function by performing spline interpolation based on the calculated coordinates of the markers.

In an embodiment, step S43 of determining a shape function may include a step at which the computer determines a shape function by performing cubic smoothing spline interpolation on the calculated coordinates of the markers.

In an embodiment, step S43 of determining a shape function may include a step at which, in order to determine a spline polynomial for each subsection between two neighboring sets of marker coordinates, the computer obtains the coefficients of the spline polynomial that satisfy all of the following conditions: a first condition in which a first derivative is continuous, a second condition in which a second derivative is continuous, and a third condition in which the values of second derivatives are 0 at the two supports of both ends, with respect to the two spline polynomials of two neighboring subsections.

In an embodiment, step S43 of determining a shape function may include a step at which the computer obtains the coefficients of the spline polynomial that additionally satisfy a fourth condition in which the square error between the marker coordinate values and the spline polynomial is minimized and a fifth condition in which the curvature of the spline polynomial is minimized, for each subsection.

In an embodiment, step S43 of determining a shape function may include a step at which the computer obtains the coefficients of the spline polynomial that additionally satisfy a sixth condition, in which the weighted sum, of the square error between the marker coordinate values and the spline polynomial, and the curvature of the spline polynomial, is minimized, for each subsection.

In an embodiment, the sixth condition may be a condition in which the weighted sum, of the square error between marker coordinate values and the spline polynomial, and the curvature of the spline polynomial, is minimized, in accordance with the above-described Equation 6.

Thereafter, at step S44, the computer may evaluate the structural health of the structure by calculating the strain or stress of the structure based on the radius of curvature calculated at each location on the determined shape function.

In an embodiment, step S44 of evaluating the structural health of the structure may include a step at which the computer calculates the radius of curvature at each location on the determined shape function in accordance with the above-described Equation 8.

In an embodiment, step S44 of evaluating the structural health of the structure may include a step at which the computer calculates strain in accordance with the above-described Equation 11.

In an embodiment, step S44 of evaluating the structural health of the structure may include a step at which the computer calculates stress in accordance with the above-described Equation 12.

Figure 5:
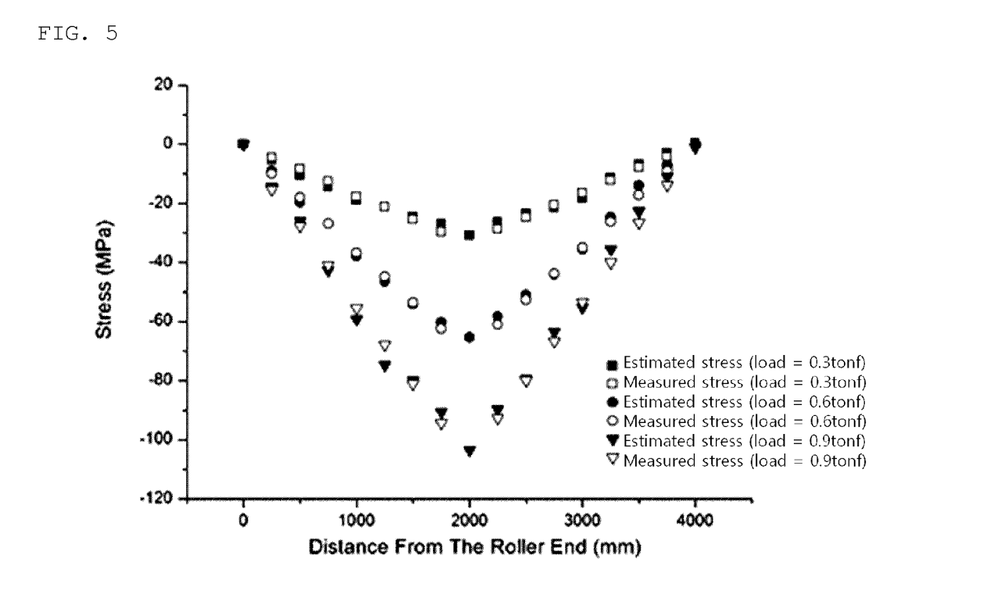
FIG. 5 is a graph showing the comparison between a stress distribution estimated in accordance with an image-based structural health monitoring system and method according to embodiments of the present invention and a measured stress distribution.

FIG. 5 is a graph showing the comparison between a stress distribution estimated in accordance with an image-based structural health monitoring system and method according to embodiments of the present invention and a measured stress distribution.

A structure, as a target of structural health monitoring, is an H-shaped steel beam having a span of 4000 mm between supports, and a predetermined load is applied to a point, on an axis connecting two supports, the point being spaced apart by 2000 mm from one support. Passive markers and strain sensors are attached at intervals of 250 mm. The image-based structural health monitoring system according to the present invention estimates a stress distribution using the passive markers. The stress distribution measured as a benchmark is provided via structural analysis based on strain values, measured by the precise strain sensors, given support and load conditions.

Referring to the graph of FIG. 5, under three load conditions (i.e., 0.3 tonf, 0.6 tonf, and 0.9 tonf), stress values estimated via cubic smoothing spline interpolation in accordance with the image-based structural health monitoring technique of the present invention are plotted by solid shapes, and stress values calculated from the strain values measured by the strain sensors are plotted by hollow shapes.

Under various load conditions, the solid shapes are shown as considerably close to the hollow shapes. This may be construed as significantly impressive results in which the solid shapes are not of values calculated via structural analysis based on the support conditions and load conditions while the hollow shapes are of stress values calculated from the radius-of-curvature values of appropriately spline-interpolated spline polynomials without considering support conditions or load conditions in accordance with the image-based structural health monitoring technique of the present invention.

Accordingly, it can be seen that, when stress values are estimated via cubic smoothing spline interpolation to which smoothing parameters appropriately selected in accordance with the image-based structural health monitoring technique of the present invention are applied, a considerably accurate stress distribution can be obtained even under uncertain support and load conditions.

Particularly, as for a portion with the greatest deformation, although the estimated stress values have slight absolute error, such absolute error is merely very small compared to the magnitude of stress that generates the deformation in the portion.

Accordingly, the image-based structural health monitoring technique of the present invention is sufficiently practical for a portion that is highly deformed.

In accordance with an image-based structural health monitoring system and method according to at least one embodiment of the present invention, there can be provided an image-based structural health monitoring system and method that are suitable for structures having uncertain load and support conditions.

In accordance with an image-based structural health monitoring system and method according to at least one embodiment of the present invention, there can be provided a motion capture technology-based structural health monitoring system and method that can be applied to cases where load and support conditions are uncertain.

The above embodiments and the accompanying drawings are intended merely to clearly illustrate part of the technical spirit of the present invention, and it will be apparent to those skilled in the art that modifications and specific embodiments that those skilled in the art can easily derive from the present specification and the accompanying drawings are all included in the range of the rights of the present invention.

Furthermore, the apparatus according to the present invention may be implemented as computer-readable code stored on a computer-readable storage medium. The computer-readable storage medium includes all types of storage devices in which data that can be read by a computer system is stored. Examples of the computer-readable storage medium include compact disk (CD)-read only memory (ROM), random access memory (RAM), an optical disk, magnetic tape, a floppy disk, a hard disk, nonvolatile memory, etc. Furthermore, the computer-readable storage medium may be distributed over computer systems connected over a network, and computer-readable code may be stored and executed on the computer-readable medium in a distributed manner.

What is claimed is:

1. An image-based structural health monitoring system, comprising:
   a marker image acquisition unit configured to acquire marker images of markers attached onto a surface of a structure;
   a marker coordinate calculation unit configured to calculate coordinates of the markers in the marker images;
   a shape function determination unit configured to determine a shape function by performing spline interpolation based on the calculated marker coordinates; and a structural health evaluation unit configured to evaluate structural health of the structure by calculating strain or stress of the structure based on a radius of curvature calculated at each location on the determined shape function.

2. The image-based structural health monitoring system of claim 1, wherein the shape function determination unit is operative to determine the shape function by performing cubic smoothing spline interpolation on the calculated marker coordinates.

3. The image-based structural health monitoring system of claim 1, wherein the shape function determination unit is operative to, in order to determine a spline polynomial for each subsection between two neighboring sets of marker coordinates, obtain coefficients of the spline polynomial so that two spline polynomials for two neighboring subsections satisfy all conditions in which a first derivative is continuous, a second derivative is continuous, and values of second derivatives are 0 at two ends.

4. The image-based structural health monitoring system of claim 3, wherein the shape function determination unit is operative to obtain the coefficients of the spline polynomial that additionally satisfy a condition in which a square error between the marker coordinate values and the spline polynomial is minimized and a condition in which a curvature of the spline polynomial is minimized, for each subsection.

5. The image-based structural health monitoring system of claim 4, wherein the shape function determination unit is operative to obtain the coefficients of the spline polynomial that additionally satisfy a condition in which a weighted sum, of the square error between the marker coordinate values and the spline polynomial, and the curvature of the spline polynomial, is minimized, for each subsection.

6. The image-based structural health monitoring system of claim 5, wherein the shape function determination unit is operative to apply the condition in which the weighted sum, of the square error between the marker coordinate values and the spline polynomial, and the curvature of the spline polynomial, is minimized, in accordance with an equation below:

$$\text{minimize } p \sum_{i=1}^{n} (z_i - S(x_i))^2 + (1-p) \int (S''(x))^2 dx$$

where p is a smoothing parameter having a value ranging from 0 to 1 and corresponds to $p \simeq 1/(1+H^3/6)$, H is an average interval value between the passive markers, $z_i$ is a z axis coordinate value of an i-th marker coordinates of n marker coordinates, $x_i$ is an x axis coordinate value of the i-th marker coordinates, S(x) is the spline polynomial, S''(x) is the second derivative of the spline polynomial, an x axis is parallel to a neutral axis of an undeformed structure, and a z axis is parallel to a direction in which the structure is deformed and is perpendicular to the x axis.

7. The image-based structural health monitoring system of claim 1, wherein the structural health evaluation unit is operative to calculate the radius of curvature at each location on the shape function in accordance with an equation below:

$$r(\bar{x}_j) = \frac{(f'(\bar{x}_j)^2 + 1)^{3/2}}{f''(\bar{x}_j)} \text{ for } j = 1 \text{ to } N$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is a radius of curvature at $\bar{x}_j$, $f'(\bar{x}_j)$ is a first derivative of shape function $f(\bar{x})$ at $\bar{x}_j$, and $f''(\bar{x}_j)$ is a second derivative of shape function $f(\bar{x})$ at $\bar{x}_j$.

8. The image-based structural health monitoring system of claim 7, wherein the structural health evaluation unit is operative to calculate the strain in accordance with an equation below:

$$\varepsilon(\bar{x}_j) = -\frac{y}{\rho(\bar{x}_j)}$$

where y is a distance from a neutral axis of the structure to the surface thereof, and $\varepsilon(\bar{x}_j)$ is the strain calculated at $\bar{x}_j$.

9. The image-based structural health monitoring system of claim 7, wherein the structural health evaluation unit is operative to calculate the stress in accordance with an equation below:

$$\sigma(\bar{x}_j) = E\varepsilon(\bar{x}_j) = -E\frac{y}{\rho(\bar{x}_j)}$$

where E is an elastic modulus of the structure, and $\sigma(\bar{x}_j)$ is the stress calculated at $\bar{x}_j$.

10. An image-based structural health monitoring method, the method being performed by a computer, the method comprising:
by the computer,
acquiring marker images of markers attached onto a surface of a structure;
calculating coordinates of the markers in the marker images;
determining a shape function by performing spline interpolation based on the calculated marker coordinates; and
evaluating structural health of the structure by calculating strain or stress of the structure based on a radius of curvature calculated at each location on the determined shape function.

11. The image-based structural health monitoring method of claim 10, wherein determining the shape function comprises determining the shape function by performing cubic smoothing spline interpolation on the calculated marker coordinates.

12. The image-based structural health monitoring method of claim 10, wherein determining the shape function comprises, in order to determine a spline polynomial for each subsection between two neighboring sets of marker coordinates, obtaining coefficients of the spline polynomial so that two spline polynomials for two neighboring subsections satisfy all conditions in which a first derivative is continuous, a second derivative is continuous, and values of second derivatives are 0 at two ends.

13. The image-based structural health monitoring method of claim 12, wherein determining the shape function comprises obtaining the coefficients of the spline polynomial that additionally satisfy a condition in which a square error between the marker coordinate values and the spline polynomial is minimized and a condition in which a curvature of the spline polynomial is minimized, for each subsection.

14. The image-based structural health monitoring method of claim 13, wherein determining the shape function comprises obtaining the coefficients of the spline polynomial that additionally satisfy a condition in which a weighted sum, of the square error between the marker coordinate values and the spline polynomial, and the curvature of the spline polynomial, is minimized, for each subsection.

15. The image-based structural health monitoring method of claim 14, wherein determining the shape function comprises applying the condition in which the weighted sum of the square error between the marker coordinate values and the spline polynomial and the curvature of the spline polynomial is minimized in accordance with an equation below:

$$\text{minimize } p\sum_{i=1}^{n}(z_i - S(x_i))^2 + (1-p)\int (S''(x))^2 dx$$

where p is a smoothing parameter having a value ranging from 0 to 1 and corresponds to $p \simeq 1/(1+H^3/6)$, H is an average interval value between the passive markers, $z_i$ is a z axis coordinate value of an i-th marker coordinates of n marker coordinates, $x_i$ is an x axis coordinate value of the i-th set of marker coordinates, $S(x)$ is the spline polynomial, $S''(x)$ is the second derivative of the spline polynomial, an x axis is parallel to a neutral axis of an undeformed structure, and a z axis is parallel to a direction in which the structure is deformed and is perpendicular to the x axis.

16. The image-based structural health monitoring method of claim 10, wherein evaluating the structural health comprises calculating the radius of curvature at each location on the shape function in accordance with an equation below:

$$r(\bar{x}_j) = \frac{(f'(\bar{x}_j)^2 + 1)^{3/2}}{f''(\bar{x}_j)} \text{ for } j = 1 \text{ to } N$$

where $\bar{x}_j$ is an $\bar{x}$ axis coordinate at the j-th location among N locations on the $\bar{x}$ axis, on which strain or stress needs to be calculated, the $\bar{x}$ axis being an axis parallel to the neutral axis of an undeformed ideal structure, $\rho(\bar{x}_j)$ is a radius of curvature at $\bar{x}_j$, $f'(\bar{x}_j)$ is a first derivative of shape function $f(\bar{x})$ at $\bar{x}_j$, and $f''(\bar{x}_j)$ is a second derivative of shape function $f(\bar{x})$ at $\bar{x}_j$.

17. The image-based structural health monitoring method of claim 16, wherein evaluating the structural health comprises calculating the strain in accordance with an equation below:

$$\varepsilon(\bar{x}_j) = -\frac{y}{\rho(\bar{x}_j)}$$

where y is a distance from a neutral axis of the structure to the surface thereof, and $\epsilon(\bar{x}_j)$ is the strain calculated at $\bar{x}_j$.

18. The image-based structural health monitoring method of claim 16, wherein evaluating the structural health comprises calculating the stress in accordance with an equation below:

$$\sigma(\bar{x}_j) = E\varepsilon(\bar{x}_j) = -E\frac{y}{\rho(\bar{x}_j)}$$

where E is an elastic modulus of the structure, and $\sigma(\bar{x}_j)$ is the stress calculated at $\bar{x}_j$.

19. A non-transitory computer-readable storage medium having stored thereon a computer program that, when executed by a computer, causes the computer to execute the steps of the method of claim 10.

* * * * *